United States Patent
Schulte et al.

(10) Patent No.: US 9,157,763 B2
(45) Date of Patent: Oct. 13, 2015

(54) MINIMAL DEAD TIME DIGITALLY COMPENSATED PROCESS TRANSMITTER

(75) Inventors: John Paul Schulte, Eden Prairie, MN (US); Steven Richard Trimble, Prior Lake, MN (US); Troy Michael Reller, Ham Lake, MN (US)

(73) Assignee: ROSEMOUNT, INC., Eden Prairie, MN (US)

( * ) Notice: Subject to any disclaimer, the term of this patent is extended or adjusted under 35 U.S.C. 154(b) by 2335 days.

(21) Appl. No.: 12/069,024

(22) Filed: Feb. 6, 2008

(65) Prior Publication Data

US 2009/0196374 A1    Aug. 6, 2009

(51) Int. Cl.
- H04B 1/04 (2006.01)
- G01D 3/036 (2006.01)
- G01D 3/08 (2006.01)
- G01D 21/00 (2006.01)

(52) U.S. Cl.
CPC ............... *G01D 3/0365* (2013.01); *G01D 3/08* (2013.01); *G01D 21/00* (2013.01)

(58) Field of Classification Search
CPC .................................... H04B 1/04; G01D 3/08
USPC ............ 375/295, 224, 228; 340/870.3; 700/1, 700/28, 31, 32, 90, 95, 108
See application file for complete search history.

(56) References Cited

U.S. PATENT DOCUMENTS

| | | | |
|---|---|---|---|
| 4,590,579 A | 5/1986 | Erb | |
| 6,445,969 B1 | 9/2002 | Kenney et al. | |
| 6,496,749 B1 | 12/2002 | Yamaguchi et al. | |
| 6,594,613 B1* | 7/2003 | Ley et al. | 702/140 |
| 6,782,296 B2 | 8/2004 | Hoche | |
| 7,092,848 B2 | 8/2006 | Hoff et al. | |
| 2003/0023328 A1 | 1/2003 | Yasui | |
| 2007/0043451 A1* | 2/2007 | Geyer | 700/42 |

FOREIGN PATENT DOCUMENTS

| | | |
|---|---|---|
| DE | 19923462 C1 | 11/2000 |
| JP | 61103335 A | 5/1986 |

OTHER PUBLICATIONS

Patent Cooperation Treaty, International Search Report and Written Opinion, 7 pages, Apr. 2, 2009.
European Patent Office, Extended European Search Report, Mar. 11, 2014, 5 pages.

* cited by examiner

*Primary Examiner* — Jaison Joseph
(74) *Attorney, Agent, or Firm* — Kinney & Lange, P.A.

(57) ABSTRACT

A process transmitter includes a sensor for producing an analog process signal as a function of a process parameter. The uncompensated analog process signal is digitized by an A/D converter and digitally compensated by a digital processor. The digitized signal from the analog-to-digital converter is also band pass filtered. The digitally compensated signal and the band pass filtered signal are combined to produce a transmitter output.

19 Claims, 4 Drawing Sheets

MINIMAL DEAD TIME DIGITALLY COMPENSATED PROCESS TRANSMITTER

BACKGROUND

The present invention relates to process transmitters. In particular, the present invention is a process transmitter featuring digital compensation with improved dynamic performance.

Process transmitters are used to monitor industrial process parameters (or process variables) such as differential pressure, gage pressure, absolute pressure, fluid flow, liquid level, temperature, pH, etc. Modern high performance process transmitters use digital signal compensation to achieve low total error. Uncompensated process signals are digitized using an analog-to-digital (A/D) converter and passed to a host microcontroller for digital compensation. Ambient temperature information is also digitized and passed to the host controller for the purpose of temperature compensation. Factory characterization produces correction coefficients that allow the device output to be very linear and temperature compensated, which provides a very low total error for static input conditions.

One consequence of this digital compensation scheme has been a sacrifice in dynamic performance. The A/D process in addition to the digital compensation process adds a significant amount of dead time to the transmitter. Typical process transmitters with digital compensation may have dead times ranging from 100 mS to 500 mS. Dead time may be problematic for applications which require fast control loops such as pulp/paper head box pressure control, or emergency shutdown applications.

Process transmitters dating back to the 1970's were all analog in nature. Lacking A/D converters and digital processors, these devices had virtually no dead time, and responded very rapidly to dynamic input signals. Unfortunately, their total performance was poor by today's standards.

There is a need for process transmitters that offer the static performance of a digitally compensated device, and the dynamic performance of an all analog device that is free of dead time.

SUMMARY

In one aspect of the invention, a processor transmitter includes a sensor, first and second signal paths, and an output circuit that produces a transmitter output as a function of signals from the first and second signal paths. The first signal path digitally compensates the process signal produced by the sensor, while the second signal path does not digitally compensate the process signal or compensates the process signal with less delay than the first signal path.

In another aspect, a process transmitter includes a process sensor, an analog-to-digital converter, digital signal processing to produce a digitally compensated process signal, and a band pass filter for passing a portion of the output of the analog-to-digital converter to produce a high speed digital signal. An output circuit produces a transmitter output as a function of the digitally compensated signal from the digital processor and the high speed signal from the band pass filter.

DETAILED DESCRIPTION

Figure 1:
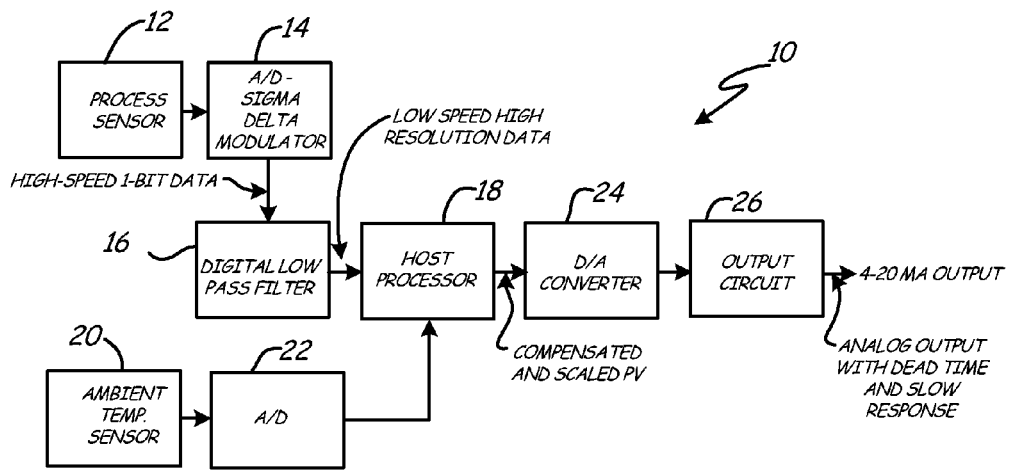
FIG. 1 is a block diagram of a prior art digitally compensated process transmitter.

FIG. 1 depicts a block diagram of a typical digitally compensated process transmitter 10, which includes process sensor 12, analog-to-digital (A/D) sigma delta modulator 14, decimating digital low pass filter 16, host processor 18, ambient temperature sensor 20, analog-to-digital (A/D) converter 22, digital-to-analog (D/A) converter 24, and output circuit 26.

Process sensor 12 produces a process signal that varies as a function of a process variable, such as differential pressure, absolute pressure, gage pressure, fluid temperature, liquid level, flow rate, etc. A process signal from process sensor 12 is digitized by A/D sigma delta modulator 14. The output of sigma delta modulator 14 is a high speed, low resolution signal. For example, the digitized process signal from sigma delta modulator 14 may be a high speed, 1 bit data stream.

Decimating digital low pass filter 16 reduces the data rate of the digitized process signal from sigma delta modulator 14, and eliminates almost all of the noise present in the signal. The low pass filtered digitized process signal is provided to host processor 18 for digital compensation.

Host processor 18, which is typically a microprocessor, executes a correction algorithm to linearize and temperature compensate the digitized process signal. Temperature compensation is based upon an ambient temperature signal from ambient temperature sensor 20, which is digitized by A/D converter 22 and provided to host processor 18. Line pressure compensation may also be performed. The process signal is scaled by host processor 18 for a desired output transfer function to accommodate the user calibrated span.

In process transmitter 10 shown in FIG. 1, the compensated and scaled process signal from host processor 18 is converted by D/A converter 24 to an analog signal. Output circuit 26 interfaces process transmitter 10 with a two wire loop to provide an analog output that is a function of the sensed process variable. In a typical system in which process transmitter 10 is connected to a two-wire loop, the analog output may vary between 4 milliamps (zero) to 20 milliamps (full scale). The digital compensation provided by process transmitter 10 allows the transmitter output to be very linear as well as being temperature compensated so that there is a very low total error for static input conditions. The conversion of the analog process signal to a digital signal and the subsequent digital compensation to linearize, temperature compensate, and scale the process variable produces some amount of dead time.

Figure 2:
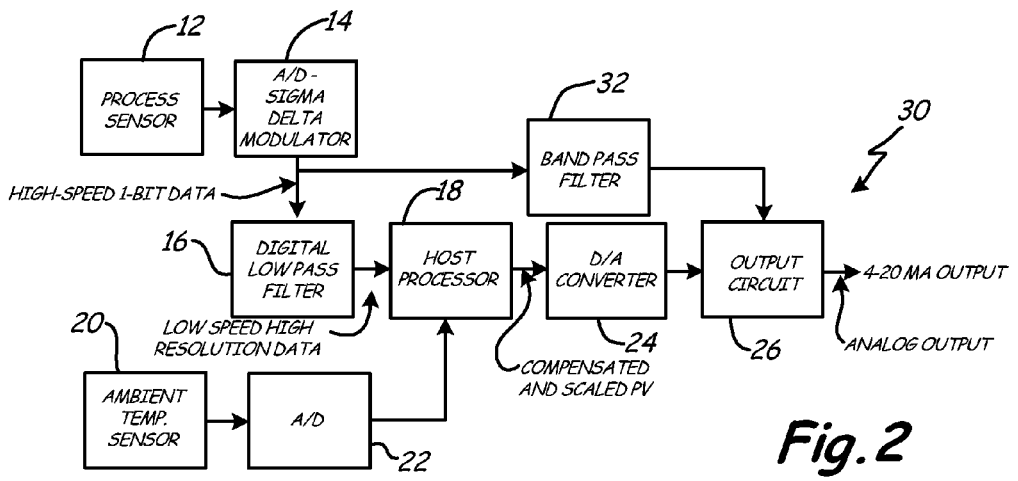
FIG. 2 is a block diagram of a process transmitter with digital compensation and enhanced dynamic performance.

FIG. 2 is a block diagram of process transmitter 30, which provides digital compensation along with enhanced dynamic performance. In this embodiment, process transmitter 30 includes many of the same components as transmitter 10, such as process sensor 12, A/D sigma delta modulator 14, decimating digital low pass filter 16, host processor 18, ambient temperature sensor 20, A/D converter 22, D/A converter 24, and output circuit 26. In addition, transmitter 30 includes band pass filter 32, which is placed between the output of A/D sigma delta modulator 14 and output circuit 26. As a result, an additional signal path is provided for the high speed data from A/D sigma delta modulator 14 (i.e., the digitized process signal) to output circuit 26. The digitized process signal from sigma delta modulator 14 is virtually free of dead time, and also is very fast. With a capacitance type pressure sensor as process sensor 12, the response time of the digital process signal at the output of sigma delta modulator 14 to dynamic process disturbances may be determined by the response time of the mechanical sensor system, and not sigma delta modulator 14. For example, a capacitance type sensor may have a time constant of around 20 mS, while the time constant of A/D sigma delta modulator 14 is less than 5 mS.

Band pass filter 32 passes some of the digitized process signal directly from A/D sigma delta modulator 14 to output circuit 26, so that the transmitter output inherits the high speed response inherent in the high speed signal. The high frequency cutoff of band pass filter 32 is set to pass the desired portion of the high speed signal, but block noise that exists above the frequency of interest. The low frequency cutoff of band pass filter 32 is set so that the overall frequency response of process transmitter 30 is in a desirable range. Output circuit 26 produces a transmitter output as a function of both a compensated and scaled process signal from host computer 18 and D/A converter 24, (i.e. the "slow" signal path) as well as the digitized process signal as filtered by band pass filter 32 (i.e. the "fast" signal path). For example, output circuit 26 may sum the high accuracy low speed information from host processor 18 and the lower accuracy high speed information from band pass filter 32. Different weights may be applied to the information from the two signals paths, as appropriate. The net result is transmitter output that has good static accuracy and good dynamic response (i.e., minimal dead time, fast response).

In some embodiments, it may be desirable to have the ability to select either the static performance provided by digital compensation, or the enhanced performance achieved by including the high speed signal from band pass filter 32. In those embodiments, a switch may be provided in the high speed or fast signal path between A/D sigma delta modulator 14 and output circuit 26 (either upstream or downstream of band pass filter 32). The switch can be enabled or disabled under software control through host processor 18. Thus, process transmitter 30 can be configurable under software control to provide the static performance of a digitally compensated system or the enhanced dynamic performance by using both the high speed signal from the fast signal path including band pass filter 32 and the digitally compensated signal from the slow signal path including host processor 18.

Band pass filter 32 can be implemented in either the analog or digital domain. For the high speed data as produced by sigma delta modulator 14, the output of the modulator 14 serves as both an analog signal and a digital signal. As a result, either an analog or a digital filter approach may be taken with band pass filter 32. For other measurement systems in which the high speed process signal may be strictly digital or strictly analog in nature, band pass filter 32 is designed to be compatible with the nature of the high speed process signal.

An analog filter can be very efficient. It may require only a small number of resistors and capacitors to provide the band pass function required for band pass filter 32.

Process transmitters often include range down configurability, i.e. ability of a user to set a sensitivity of the transmitter output to the sensed process parameter. To provide range down configurability in process transmitter 30, a similar scaling feature must be included in band pass filter 32 so that the enhanced dynamic response can work at any range down factor being used to generate the digitally compensated signal. Host processor 18 sets the gain of band pass filter 32 according to the range down factor of transmitter 30 in order to achieve the desired response. The programmable gain function in band pass filter 32 may be implemented, for example, with an operational amplifier and other support circuitry, when band pass filter 32 is an analog type filter. For implementations using digital band pass filtering, band pass filter 32 typically includes a digital signal processor in conjunction with a high speed D/A converter, so that an analog "fast" signal from the fast signal path that can be combined at output circuit 26 with the analog slow signal from D/A converter 24 of the slow signal path. With a digital implementation, the scaling factor can be incorporated into the digital signal processor, and its selection of the scaling factor is provided to the digital signal processor by host processor 18.

Process transmitter 30 may also include user selectable transmitter damping that can be set at various levels. This can, in effect, alter the time constant of the compensated path for the slow signal. The effect of selectable damping can be accommodated by varying the configuration of band pass filter 32 as a function of user damping. Host processor 18 can control the configuration of band pass filter 32 as a function of the transmitter damping selected by the user.

Because the digitized process signal passing through band pass filter 32 bypasses the digital compensation performed by host processor 18, the accuracy of the signals from band pass filter 32 will be compromised to some extent. However, since nothing can pass through the band pass filter 32 at DC (or near DC), the static accuracy of transmitter 30 will not be affected. Reference accuracy and temperature effects tests for transmitter 30 should give substantially the same performance as devices such as transmitter 10 that do not offer improved dynamic performance.

The accuracy of dynamic signals, however, will be compromised due to the uncompensated portion of the digitized process signal reaching the output of the transmitter. For applications that integrate the transmitter output, there may be accuracy considerations that need to be taken into account.

The high speed digitized process signal in many cases will be relatively noisy. Band pass filter 32 will remove much of this noise but it is possible that composite analog output noise could increase. Many modern measurement systems offer a tradeoff between measurement noise and response time or latency. This is yet another example of that type of tradeoff.

If the accuracy or noise degradation caused by the high speed path is undesirable, then the switch mechanism previously described can be used to disable the high speed signal path. Then transmitter 30 reverts to the traditional architecture depicted in FIG. 1.

A computer based simulation was used to compare performance of digitally compensated process transmitter 10 of FIG. 1 with the enhanced performance process transmitter 30 of FIG. 2. The computer simulation was performed using Matlab Simulink.

Figure 3:
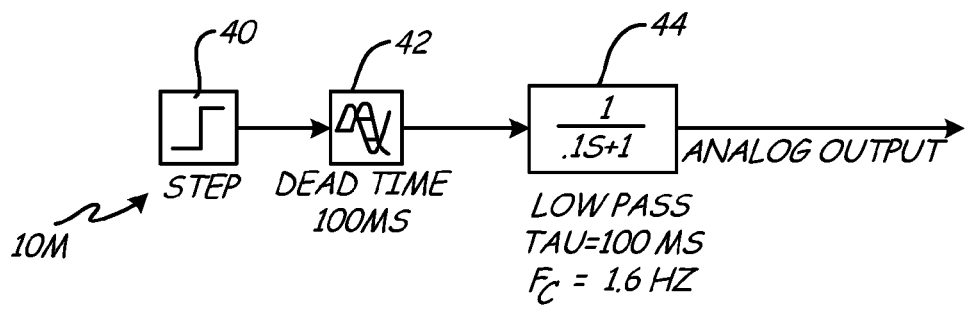
FIG. 3 shows a model of the prior art process transmitter of FIG. 1.

FIG. 3 shows model 10M, which is a model of prior art digitally compensated process transmitter 10 of FIG. 1. Model 10M includes step block 40, dead time block 42, and low pass block 44.

Figure 4:
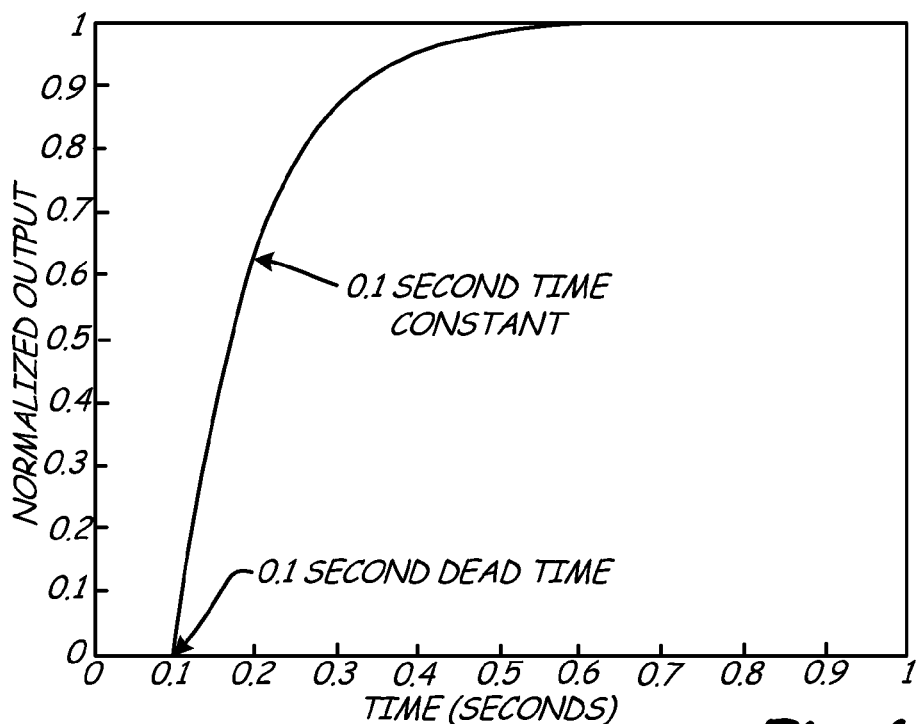
FIG. 4 is a plot of normalized output as a function of time showing response of the prior art transmitter modeled in FIG. 3 to a step input.

In model 10M, the input is a step, represented by step block 40, with an initial value of 0 at time zero, and stepping to a value of "1" for the duration of the simulation. Dead time block 42 adds a simple delay of 100 mS to the input. Low pass block 44 applies a low pass filter to the signal. In this case, the filter time constant tau is set to 100 mS that corresponds to a low pass cut off frequency Fc of 1.6 Hz. The time domain response of model 10M is depicted in FIG. 4.

Figure 5:
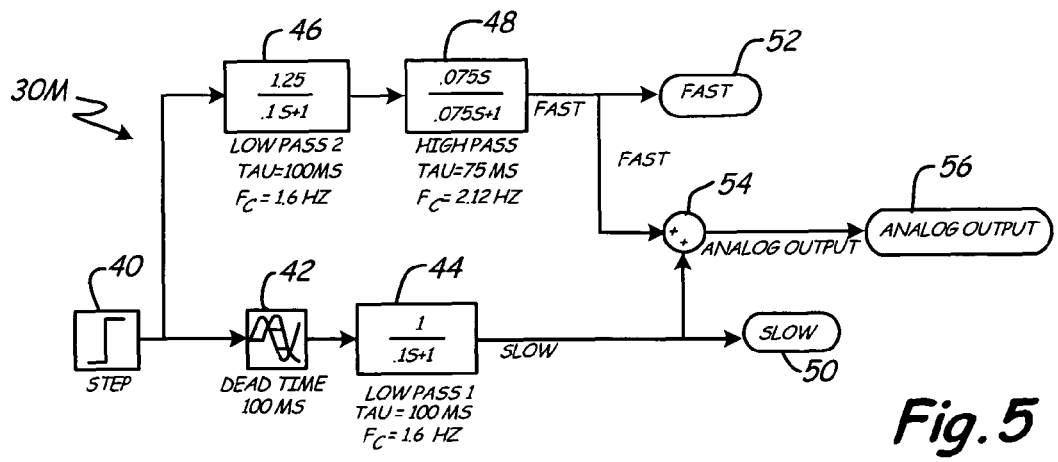
FIG. 5 is a diagram illustrating a model of the process transmitter of FIG. 2.

Model 30M shown in FIG. 5 is a model of enhanced process transmitter 30 of FIG. 2. Those elements of model 10M (step 40, dead time 42, and low pass 44) that are common to models 10M and 30M are shown in FIG. 5. These elements form the slow signal path to produce the slow, accurate compensated signal labeled "slow" in FIG. 5.

A high speed or fast signal path is also included in model 30M. Band pass filter 32 of FIG. 2 is modeled by low pass block 46 and high pass block 48.

Low pass block 46 has a gain of 1.25, a time constant tau of 100 mS, and a cutoff frequency $f_c$ of 1.6 Hz. In practice this would be the output of sigma delta modulator 14, as affected by the mechanical damping of process sensor 12.

High pass block 48 passes signals above a cutoff frequency $f_c$ of 2.12 Hz. The time constant tau of high pass block 48 is 75 mS. High pass block 48 is optimized to achieve a desirable analog output characteristic.

Together, low pass block 46 and high pass block 48 create a band pass filter with a center frequency of 1.8377 Hz. The pass band gain is 0.5357, and Q is 0.4949.

The output of the slow (i.e., digitally compensated signal) path is slow signal 50, and the output of the fast (i.e., high speed uncompensated) signal path is fast signal 52. Summer 54 combines slow signal 50 and fast signal 52 to produce analog output 56. Summer 54 models the function of output circuit 26 of transmitter 30.

Figure 6:
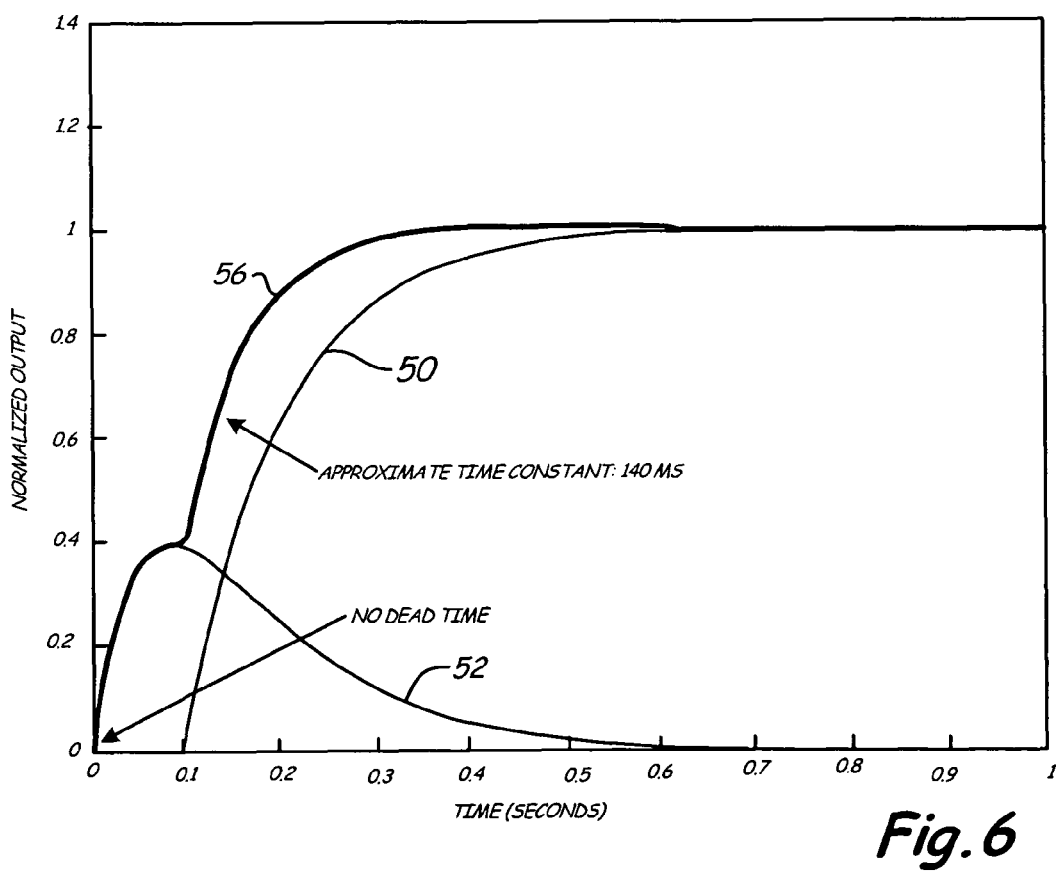
FIG. 6 is a plot of normalized output as a function of time for the transmitter of FIG. 2, as modeled in FIG. 5.

The step response of transmitter model 30M is shown in FIG. 6. Slow signal waveform 50 shows the same response as FIG. 4. Fast signal wave form 52 shown in FIG. 6 shows a response of the band pass filter 32, as modeled by low pass filter block 46 and high pass filter block 48. Since the fast signal path is dead time free, fast signal 52 immediately responds to the step input from step block 40. At a time of 100 mS, however, the band pass response reaches its peak, and fast signal 52 begins to decay. This is designed to be at the time when the dead time of the slow signal path ends and slow signal 50 begins to rise.

Analog output 56 is the composite signal formed by summing slow signal 50 and fast signal 52. Analog output signal 56 follows fast signal 52 from 0 to 100 mS, then transitions from fast signal 52 to slow signal 50 until fast signal 52 decays at about 500 mS to 700 mS. From then on, analog output 56 follows slow signal 50.

Figure 7:
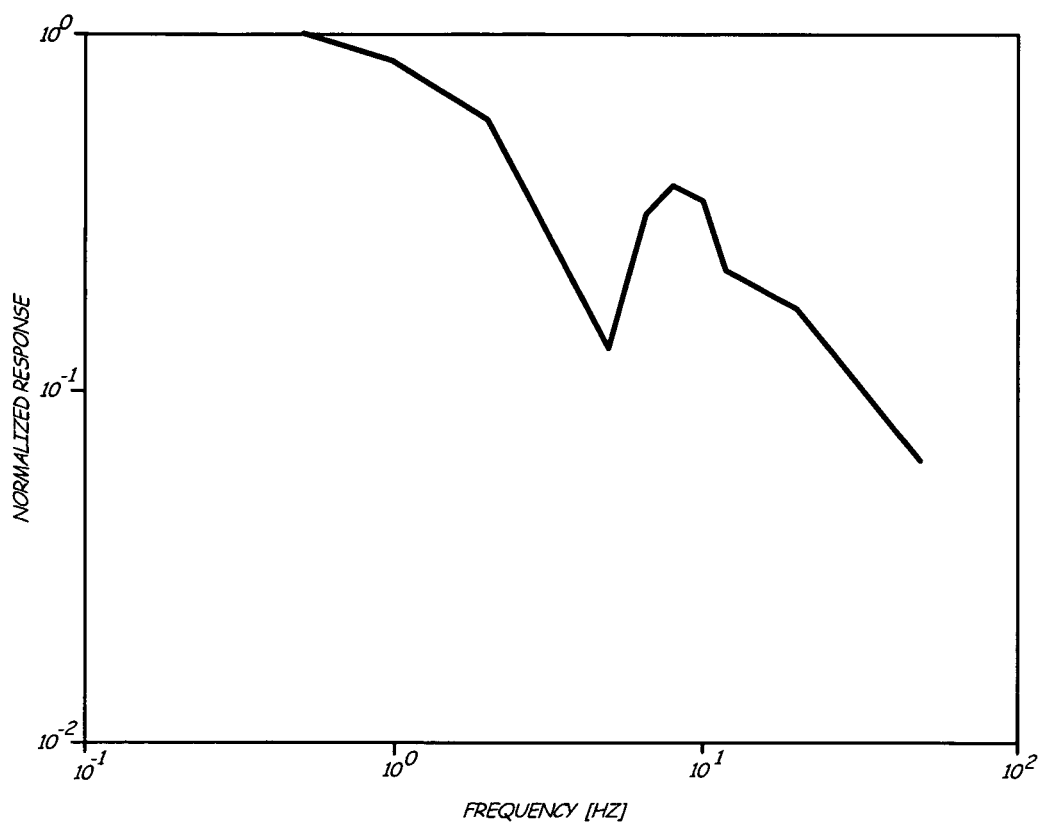
FIG. 7 is a graph of normalized response as a function of frequency for the process transmitter of FIG. 2.

FIG. 7 is a graph representing magnitude frequency response of modeled process transmitter 30M. Since model 30M is composed of linear elements, the response to a sine wave input will also be sinusoidal. Several observations can be made from FIG. 7.

First, the magnitude response is about 0.7 at a frequency of 1.6 Hz. This relates to the 1.6 Hz low pass blocks 44 and 46 in model 30M. Below 1.6 Hz, there is little or no attenuation.

Second, peaking occurs around 10 Hz. This is where the dead time delay of the slow signal path matches the period of the input signal. There is a 360 degree phase shift in the slow signal path relative to the fast signal path, so that the two signals are in phase and additive. Ideally, this peaking would not exist, and the peak may be eliminated by further refinement of the filter structures used in model 30M (and thus in transmitter 30).

The process transmitter of the present invention provides the static performance of a digitally compensated transmitter, while offering improved dynamic performance that reduces or eliminates dead time. By providing a fast signal path in addition to the digitally compensated slow signal path, and using signals from both the fast and slow signal paths generate a transmitter output, the process transmitter retains the total performance of a digitally compensated process transmitter, while offering dynamic performance that approximates that of traditional analog process transmitters.

In the embodiments discussed above, the fast signal path is shown as including only high pass filter 32. In other embodiments, the fast signal path can also include compensation of the fast signal in order to reduce degradation of dynamic accuracy. The compensation can be provided by a simple compensation algorithm that is easier and faster to execute than the digital compensation algorithms used in the slow signal path. For example, consider a fast signal path that produces updates ten times faster than the slow signal path. A simple compensation algorithm performed by host processor 18 on the signal in the fast signal path (e.g., after it has been filtered by band pass filter 32) can provide improved dynamic performance with less degradation of dynamic accuracy.

Although the present invention has been described with reference to preferred embodiments, workers skilled in the art will recognize that changes may be made in form and detail without departing from the spirit and scope of the invention.

The invention claimed is:

1. A process transmitter comprising;
    a sensor for producing a process signal that is a function of a process parameter;
    a first signal path in which the process signal is digitally compensated;
    a second signal path in which the process signal is subject to less dead time delay than the first signal path; and
    an output circuit for producing a transmitter output as a function of signals received from the first signal path and the second signal path.

2. The process transmitter of claim 1, wherein the output circuit sends the signals from the first signal path and the second signal path.

3. The process transmitter of claim 1, wherein the second signal path includes a band pass filter.

4. The process transmitter of claim 3, wherein a parameter of the band pass filter is controlled as a function of a transmitter range down factor.

5. The process transmitter of claim 4, wherein the parameter of the band pass filter controlled as a function of a transmitter range down factor is a scaling parameter.

6. The process transmitter of claim 1, wherein a parameter of the band pass filter is controlled as a function of user selectable damping.

7. The process transmitter of claim 1, wherein the second signal path is selectively connectable between the sensor and the output circuit.

8. The process transmitter of claim 1 and further comprising:
    an analog-to-digital converter for converting the process signal from analog-to-digital.

9. The process transmitter of claim 8, wherein the first and second signal paths are connected between the analog-to-digital converter and the output circuit.

10. The process transmitter of claim 9, wherein first signal path includes a digital low pass filter and a digital processor.

11. The process transmitter of claim 10, wherein the digital processor compensates the process signal for at least one of ambient temperature, linearity, and line pressure, and scales the process signal.

12. A process transmitter comprising:
    a process sensor for producing a process signal that is a function of a process parameter;
    an analog-to-digital converter for digitizing the process signal;

a digital processor for digitally compensating the digitized process signal;

a band pass filter for filtering the digitized process signal from the analog-to-digital converter; and an output circuit for producing a transmitter output as a function of the digitally compensated process signal and the filtered process signal, wherein the digitally compensated process signal is dead time delayed with respect to the filtered process signal.

13. The process transmitter of claim 12, wherein the output circuit sums the digitally compensated process signal and the filtered process signal.

14. The process transmitter of claim 12, wherein the output circuit produces an analog output signal as the transmitter output.

15. The process transmitter of claim 12, where in the digital processor controls one or more parameters of the band pass filter.

16. The process transmitter of claim 15, wherein the digital processor controls a scaling parameter of the band pass filter as a function of a transmitter range down factor.

17. The process transmitter of claim 15, wherein the digital processor controls a parameter of the band pass filter as a function of user selectable damping.

18. The process transmitter of claim 12, wherein the digital processor controls whether the band pass filtered process signal is supplied to the output circuit.

19. The process transmitter of claim 12 and further comprising:

a decimating digital low pass filter connected between the analog-to-digital converter and the digital processor.

* * * * *